(12) United States Patent
Lin (10) Patent No.: US 10,587,840 B1
(45) Date of Patent: Mar. 10, 2020

(54) IMAGE PROCESSING METHOD CAPABLE OF DEINTERLACING THE INTERLACING FIELDS

(71) Applicant: Realtek Semiconductor Corp., HsinChu (TW)

(72) Inventor: Ming-Ta Lin, New Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/542,330

(22) Filed: Aug. 16, 2019

(30) Foreign Application Priority Data

Jan. 17, 2019 (TW) .............................. 108101842 A (51) Int. Cl.
*H04N 7/01* (2006.01)
*H04N 5/14* (2006.01)

(52) U.S. Cl.
CPC ........... *H04N 7/0137* (2013.01); *H04N 5/145* (2013.01)

(58) Field of Classification Search
None
See application file for complete search history.

(56) References Cited

U.S. PATENT DOCUMENTS

| | | | |
|---|---|---|---|
| 6,556,193 B1 * | 4/2003 | Auld ..................... | G06T 3/4007 345/418 |
| 7,349,029 B1 * | 3/2008 | Chou .................. | H04N 7/0112 348/441 |
| 7,538,824 B1 * | 5/2009 | Pillay .................... | H04N 7/012 348/452 |
| 8,913,186 B2 * | 12/2014 | Zhou ..................... | H04N 7/014 348/448 |
| 2004/0233326 A1 * | 11/2004 | Yoo ...................... | H04N 7/0112 348/452 |
| 2004/0263685 A1 * | 12/2004 | Song ..................... | H04N 7/012 348/452 |
| 2005/0238247 A1 * | 10/2005 | Kondo ................. | H04N 7/0125 382/254 |
| 2006/0023119 A1 * | 2/2006 | Han ...................... | H04N 5/145 348/452 |

(Continued)

FOREIGN PATENT DOCUMENTS

| | | |
|---|---|---|
| TW | 201041374 A1 | 11/2010 |
| TW | 201246920 A1 | 11/2012 |

*Primary Examiner* — Jefferey F Harold
*Assistant Examiner* — Mustafizur Rahman
(74) *Attorney, Agent, or Firm* — Winston Hsu (57) ABSTRACT

The image processing system receives first field information, second field information, and third field information. The first and the third field information correspond to first pixels, and the second field information corresponds to second pixels. The first pixels and the second pixels are disposed in interlaced rows. Generate the motion adaptive deinterlacing parameter of a first pixel by performing the motion detection and interpolation according to the first and the third field information. Calculate the horizontal and the vertical compensating display parameters of the first pixel according to the horizontal and vertical motion estimation values and the first and the third field information. Generate the mixed display parameter of the first pixel by using a weighted average of the horizontal or the vertical compensating display parameter of the first pixel and the motion adaptive deinterlacing parameters of the first pixel.

20 Claims, 4 Drawing Sheets

(56) References Cited

U.S. PATENT DOCUMENTS

| | | | |
|---|---|---|---|
| 2006/0077289 A1* | 4/2006 | Lee .................. | H04N 7/0115 348/441 |
| 2008/0055465 A1* | 3/2008 | Chang ................ | H04N 7/012 348/448 |
| 2008/0181517 A1* | 7/2008 | Aokage .............. | H04N 5/144 382/236 |
| 2008/0246876 A1* | 10/2008 | Hayner .............. | H04N 7/012 348/448 |
| 2009/0051810 A1* | 2/2009 | Tian .................. | H04N 7/0112 348/452 |
| 2009/0147133 A1* | 6/2009 | Wei .................... | H04N 7/012 348/452 |
| 2010/0309372 A1* | 12/2010 | Zhong ................ | H04N 7/012 348/452 |
| 2012/0170657 A1* | 7/2012 | Wang ................. | H04N 7/012 375/240.16 |
| 2014/0002733 A1* | 1/2014 | George .............. | H04N 7/012 348/452 |
| 2017/0195621 A1* | 7/2017 | Zhou ................. | H04N 7/012 |

\* cited by examiner

IMAGE PROCESSING METHOD CAPABLE OF DEINTERLACING THE INTERLACING FIELDS

BACKGROUND OF THE INVENTION

1. Field of the Invention

The present invention is related to an image processing method, and more particularly, to an image processing method capable of deinterlacing the interlacing fields.

2. Description of the Prior Art

In general, when transmitting image data to a display for displaying an image, the image data can be input in a progressive manner or an interlaced manner. When the image data is updated in the progressive manner, all pixels in one display frame of the display are updated in every frame period. That is, in each frame period, all pixels in the display frame are given new display parameters, such as the brightness values of respective colors, according to the corresponding image data at that time.

However, in prior art, in order to reduce the bandwidth required for image data transmission, an interlaced scanning method may be used to input image data. When the image data is updated in such an interlaced manner, pixels in the display frame are divided into two fields that are interlaced with each other, such as a field with pixels in odd rows and a field with pixels in even rows. In this case, in each frame period, only the pixels corresponding to one of the fields are given new display parameters according to the corresponding image data at that time, and the display parameters of the pixels corresponding to the other field are set by interpolation or copying, which is called deinterlacing. Since objects in the image may be moving or deforming when deinterlacing is performed, the display parameter corresponding to each pixel may not be correctly predicted, thereby causing flickering or blurring edges on the objects when displaying the image.

SUMMARY OF THE INVENTION

One embodiment of the present invention discloses an image processing method. The image processing method includes receiving first field information, second field information, and third field information corresponding to a display frame. Each of the first field information and the third field information has display parameters of first pixels disposed in a first group of rows of the display frame, the second field information has display parameters of second pixels disposed in a second group of rows of the display frame, and rows in the first group of rows and rows in the second group of rows are interfaced with one another.

The image processing method further includes performing motion detection according to the first field information and the third field information, generating a plurality of motion adaptive deinterlacing display parameters of the first pixels by performing interpolation according to the first field information, the second field information, and/or the third field information in accordance with a result of the motion detection, generating a horizontal motion estimation value for each first pixel by performing a horizontal motion estimation according to the first field information and the third field information, generating a vertical motion estimation value for each first pixel by performing a vertical motion estimation according to the first field information and the third field information, calculating a horizontal compensating display parameter for each first pixel according to the horizontal motion estimation value of each first pixel, the first field information, and the third field information, calculating a vertical compensating display parameter for each first pixel according to the vertical motion estimation value of each first pixel, the first field information, and the third field information, generating a horizontal estimation representative value for each row of first pixels according to a plurality of horizontal motion estimation values of first pixels in each row, generating a vertical estimation representative value for each column of first pixels according to a plurality of vertical motion estimation values of first pixels in each column, generating a mixed display parameter for each first pixel by using a weighted average of one of the horizontal compensating display parameter and the vertical compensating display parameter of the first pixel and a motion adaptive deinterlacing display parameter of the first pixel according to the horizontal estimation representative value and the vertical estimation representative value of the first pixel, and displaying a plurality of mixed display parameters of the first pixels in the first group of rows and the display parameters of the second pixels in the second group of rows in a same frame.

Another embodiment of the present invention discloses an image processing method. The method includes receiving first field information, second field information, and third field information corresponding to a display frame. Each of the first field information and the third field information has display parameters of first pixels disposed in a first group of rows of the display frame, the second field information has display parameters of second pixels disposed in a second group of rows of the display frame, and rows in the first group of rows and rows in the second group of rows are interfaced with one another.

The method further includes performing motion detection according to the first field information and the third field information, generating a plurality of motion adaptive deinterlacing display parameters of the plurality of rows of first pixels according to a result of the motion detection, generating a motion estimation value for each first pixel by performing a motion estimation on a specific direction according to the first field information and the third field information, calculating a compensating display parameter for each first pixel according to the motion estimation value of each first pixel, the first field information, and the third field information, generating an estimation representative value for each row of first pixels according to a plurality of motion estimation values of first pixels in each row, and generating a mixed display parameter of each first pixel by using a weighted average of the compensating display parameter of the first pixel and a motion adaptive deinterlacing display parameter of the first pixel according to the estimation representative value of the first pixel.

Another embodiment of the present invention discloses an image processing system. The image processing system includes a display frame, a receiving unit, a motion detection circuit, a motion adaptive deinterlacing circuit, a motion estimation circuit, a motion compensation circuit, and a mixed display parameter generator.

The receiving unit receives first field information, second field information, and third field information corresponding to the display frame. Each of the first field information and the third field information has display parameters of first pixels disposed in a first group of rows of the display frame, the second field information has display parameters of second pixels disposed in a second group of rows of the display frame, and rows in the first group of rows and rows in the second group of rows are interfaced with one another.

The motion detection circuit is coupled to the receiving unit, and performs motion detection according to the first field information and the third field information. The motion adaptive deinterlacing circuit is coupled to the motion detection circuit, and generates a plurality of motion adaptive deinterlacing display parameters corresponding to the plurality of rows of first pixels by performing interpolation according to the first field information, the second field information, and/or the third field information in accordance with a result of the motion detection.

The motion estimation circuit is coupled to the receiving unit. The motion estimation circuit generates a horizontal motion estimation value for each first pixel by performing a horizontal motion estimation according to the first field information and the third field information, and generates a vertical motion estimation value for each first pixel by performing a vertical motion estimation according to the first field information and the third field information.

The motion compensation circuit is coupled to the motion estimation circuit. The motion compensation circuit calculates a horizontal compensating display parameter for each first pixel according to the horizontal motion estimation value of each first pixel, the first field information, and the third field information, calculates a vertical compensating display parameter for each first pixel according to the vertical motion estimation value of each first pixel, the first field information, and the third field information, generates a horizontal estimation representative value for each row of first pixels according to a plurality of horizontal motion estimation values of first pixels in each row, and generates a vertical estimation representative value for each column of first pixels according to a plurality of vertical motion estimation values of first pixels in each column.

The mixed display parameter generator is coupled to the motion compensation circuit and the motion adaptive deinterlacing circuit. The mixed display parameter generator generates a mixed display parameter for each first pixel by using a weighted average of one of the horizontal compensating display parameter and the vertical compensating display parameter of the first pixel and a motion adaptive deinterlacing display parameter of the first pixel according to the horizontal estimation representative value and the vertical estimation representative value of the first pixel. The plurality of mixed display parameters of the first pixels in the first group of rows and the display parameters of the first pixels in the second group of rows are displayed by the display frame in a same frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
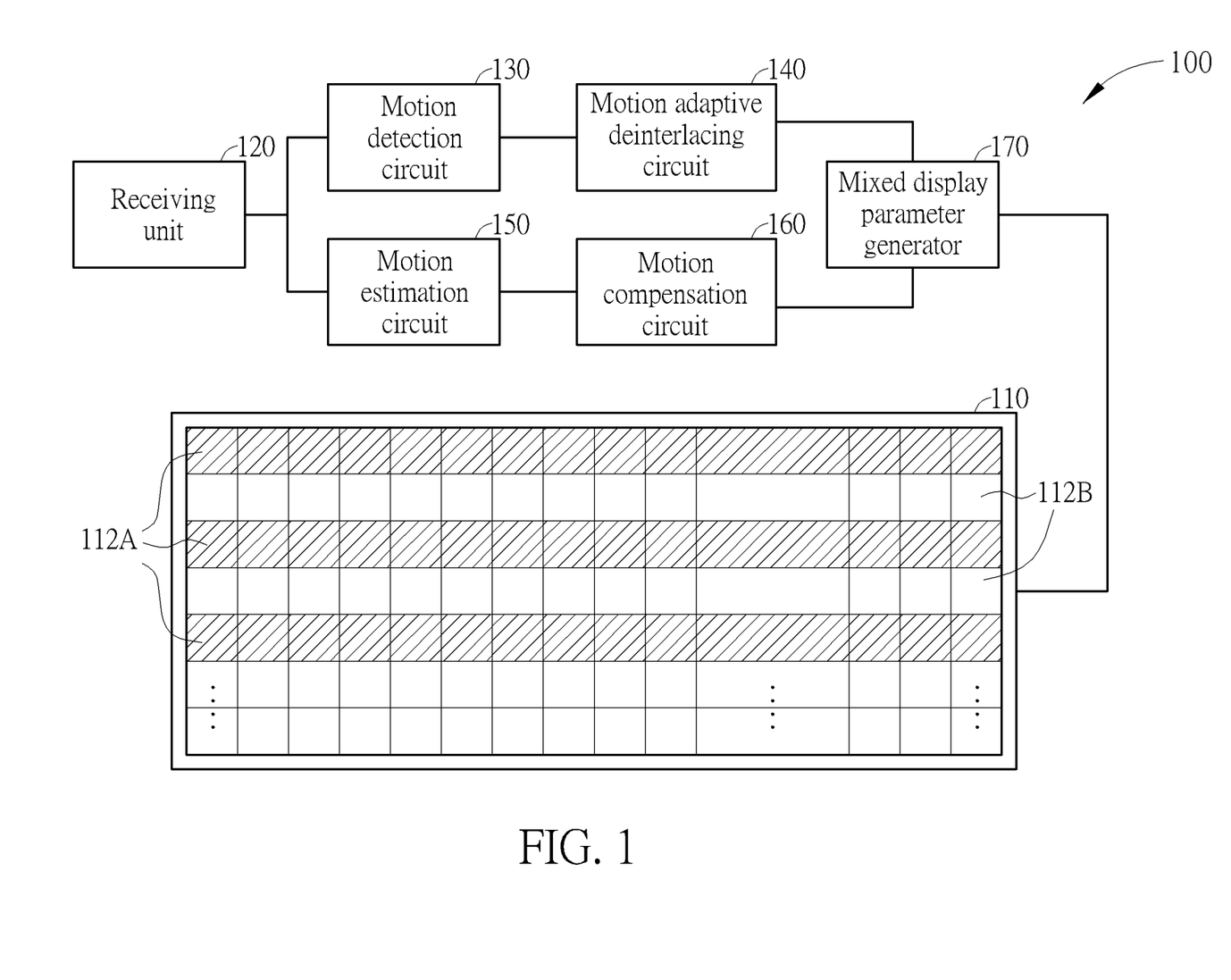
FIG. 1 shows an image processing system according to one embodiment of the present invention.

FIG. 1 shows an image processing system 100 according to one embodiment of the present invention. The image processing system 100 includes a display 110, a receiving unit 120, a motion detection circuit 130, a motion adaptive deinterlacing circuit 140, a motion estimation circuit 150, a motion compensation circuit 160, and a mixed display parameter generator 170.

The display 110 can include a display frame 112 for display images, and the display frame 112 can include a plurality of pixels. The display frame 112 can display the image according to the display parameters, such as the brightness of different colors, received by each pixel.

In some embodiments, pixels in the display frame 112 may correspond to two fields. For example, the display frame 112 can include first pixels disposed in a first group of rows and second pixels disposed in a second group of rows. The rows of the first group of rows and the rows of the second group of rows are interlaced with each other. For example, the first pixels can be disposed in the even rows (including the $0^{th}$ row and the $2^{nd}$ row) and can be corresponding to the field 112A. Also, the second pixels can be disposed on the odd rows (including the $1^{st}$ row and the $3^{rd}$ row), and can be corresponding to the field 112B.

In addition, the receiving unit 120 will receive the field information of the field 112A and the field information of the field 112B in turn. For example, the receiving unit 120 can receive the first field information corresponding to the field 112A, the second field information corresponding to the field 112B, and the third field information corresponding to the field 112A sequentially. The first field information and the third field information may each have the display parameters of the first pixels disposed in the first group of rows of the display frame 112, and the second field information may have the display parameters of the second pixels disposed in the second group of rows of the display frame 112.

Since the second field information does not include the display parameters of the first pixels, the image processing system 100 has to calculate the possible display parameter for each first pixel before the image processing system 100 can display the image corresponding to the second field information through the display 110. In some embodiments, the image processing system 100 can calculate the motion adaptive deinterlacing display parameter of each first pixel by using the motion detection circuit 130 and the motion adaptive deinterlacing circuit 140.

For example, the motion detection circuit 130 can be coupled to the receiving unit 120, and the motion adaptive deinterlacing circuit 140 can be coupled to the motion detection circuit 130. The motion detection circuit 130 can perform motion detection according to the first field image and the third field image to determine whether an object in the images has moved from the first field information and the second field information.

Next, the motion adaptive deinterlacing circuit 140 can generate the motion adaptive interlacing display parameters for the first pixels by performing interpolation according to the first field information, the second field information, and/or the third field information.

For example, when the result of the motion detection shows that no motion has occurred from the first field information and the third field information, it may imply that the display parameters of the first pixels should be very close to the display parameters provided by the first field information and the third field information. In this case, the motion adaptive deinterlacing circuit 140 can generate the motion adaptive deinterlacing display parameter of a first pixel by performing interpolation according to the display parameters of the first pixel provided by the first field information and the third field information.

However, when the result of the motion detection from the first field information and the third field information shows that a motion has occurred, it may imply that the display parameters of the first pixels may be quite different from the display parameters provided by the first field information and the third field information. In this case, the motion adaptive deinterlacing circuit 140 can generate the motion adaptive deinterlacing display parameters of the first pixels by performing interpolation according to the display parameters of the second pixels adjacent to the first pixel provided by the second field information.

That is, with the motion detection circuit 130 and the motion adaptive deinterlacing circuit 140, the image processing system 100 can decide to perform the inter field interpolation or the intra field interpolation to generate the motion adaptive deinterlacing display parameters according to whether the motion has been detected or not.

Since the motion adaptive deinterlacing display parameter is generated without considering the direction and the distance of the object motion, the interpolation result may not be very accurate. However, since the objects in the image may move in different directions, it will take a lot of computing resources and time to detect the direction and distance of the actual motion of the object.

In addition, in the image, since the structures of the characters and the symbols include many details, if the edges are blurred, it may be difficult for the viewer to recognize the content. For example, in TV news, there is often a marquee of news alerts. If the horizontal or vertical movement of the marquee is not taken into account when interpolating the display parameters, the edges of the characters may become ambiguous and unrecognizable.

In some embodiments, the image processing system 100 can estimate the object motions on the horizontal direction and the vertical direction with the motion estimation circuit 150, and generate the horizontal compensating display parameter and the vertical compensating display parameter for each first pixel with the motion compensation circuit 160. Then, the image processing system 100 can generate the mixed display parameter for each first pixel by using a weighted average of one of the horizontal compensating display parameter or the vertical compensating display parameter of the first pixel and a motion adaptive deinterlacing display parameter of the first pixel, and the display 110 will display the mixed display parameters of the first pixels and the display parameters of the second pixels provided by the second field information in the same frame with the display frame 112. Since the mixed display parameters are generated with the compensations for the horizontal and vertical motions, the image processing system 100 is able to present images with better quality, and reduce the issues of blurred edges and flickering.

In FIG. 1, the motion estimation circuit 150 can be coupled to the receiving unit 120, and can perform the horizontal motion estimation according to the first field information and the third field information to generate the horizontal motion estimation value for each first pixel, and perform the vertical motion estimation according to the first field information and the third field information to generate the vertical motion estimation value for each first pixel.

Figure 2:
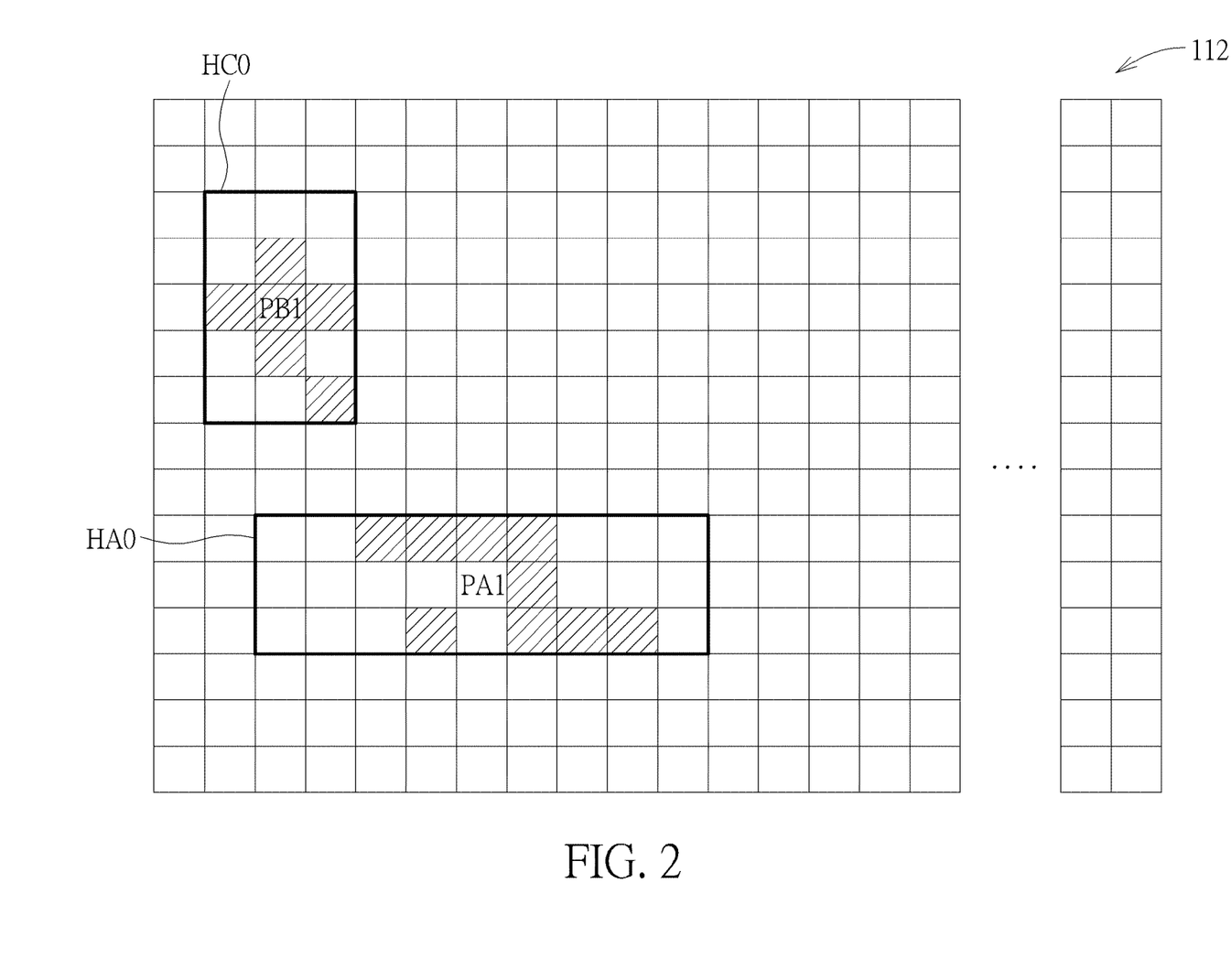
FIG. 2 shows the image content provided by the first field information according to one embodiment of the present invention.
Figure 3:
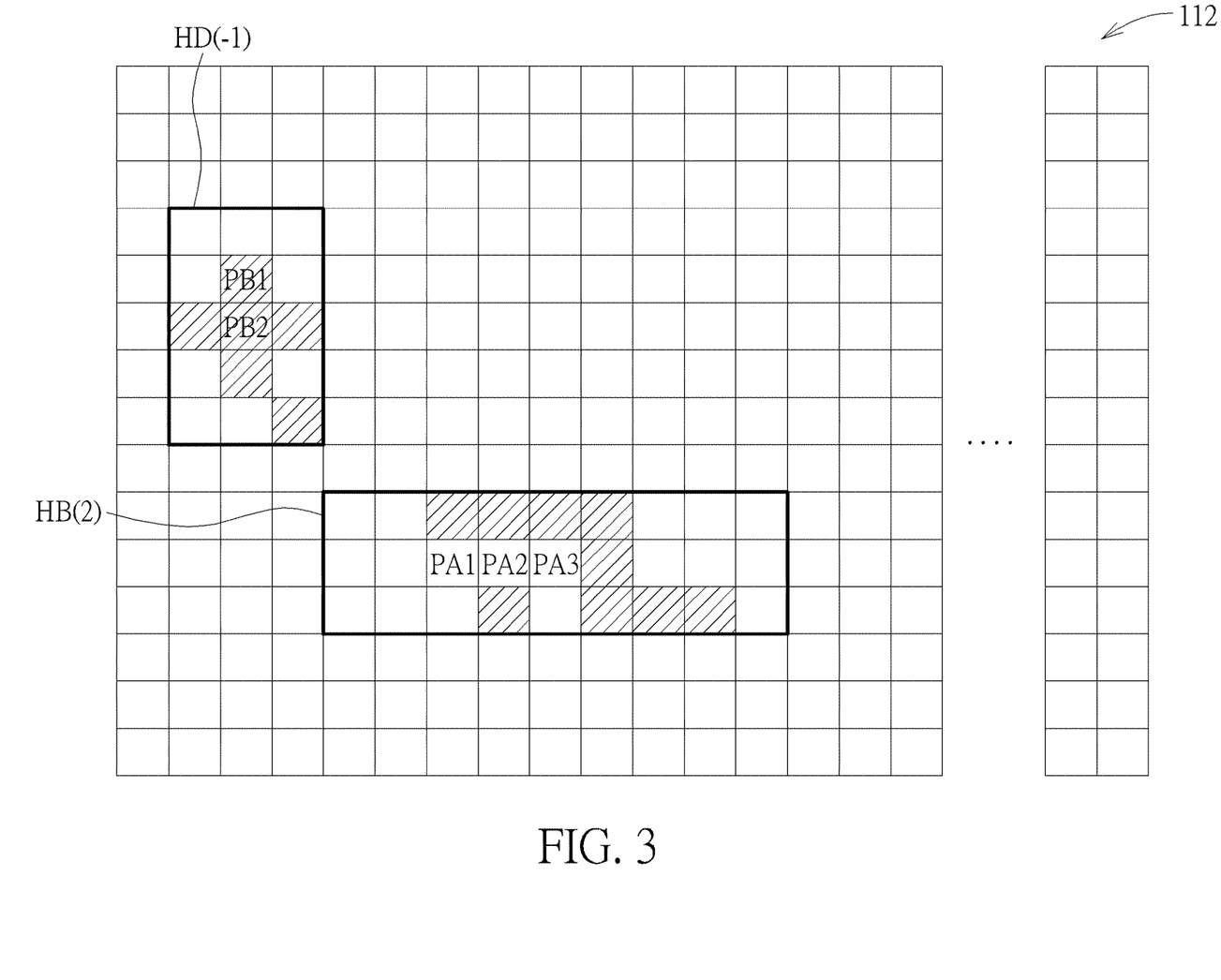
FIG. 3 shows the image content provided by the third field information according to one embodiment of the present invention.

FIG. 2 shows the image content provided by the first field information according to one embodiment of the present invention, and FIG. 3 shows the image content provided by the third field information according to one embodiment of the present invention.

When the motion estimation circuit 150 needs to determine which pixel in FIG. 3 is corresponding to the same object as the first pixel PA1 in FIG. 2 to calculate the horizontal motion estimation value between these two, the motion estimation circuit 150 can select a horizontal comparison block HA0 including a plurality of pixels centered at the first pixel PA1, and select a plurality of horizontal candidate blocks along the horizontal direction centered at the horizontal comparison block HA0. For example, in addition to the horizontal candidate block disposed at the same place as the horizontal comparison block HA0, the motion estimation circuit 150 can also select 9 horizontal candidate blocks to the left successively, and select 9 horizontal candidate blocks to the right successively. That is, the motion estimation circuit 150 can select a total of 19 horizontal candidate blocks. In some other embodiments, the motion estimation circuit 150 may select a greater or lesser number of horizontal candidate blocks depending on the requirements and limitations of the actual application for accuracy and computing resources.

Then, the motion estimation circuit 150 can calculate a plurality of horizontal sums of absolute differences (SAD) between the display parameters in the first field information corresponding to the pixels in the horizontal comparison block HA0 and the display parameters in the third field information corresponding to the pixels in the plurality of horizontal candidate blocks respectively. When the sum of absolute differences between the horizontal comparison block HA0 and a horizontal candidate block is rather small, it may imply that the content of these two blocks is rather similar. Therefore, in some embodiments, the motion estimation circuit 150 can estimate the horizontal motion estimation value of the first pixel PA1 according to the horizontal candidate block having the smallest sum of absolute differences with the horizontal comparison block HA0.

For example, in FIG. 2 and FIG. 3, the display parameters in the first field information corresponding to the pixels of the horizontal comparison block HA0 are most similar to the display parameters in the third field information corresponding to the pixels of the horizontal candidate block HB(2), that is, the sum of absolute differences between these two blocks is the smallest, meaning that the object corresponding to the first pixel PA1 in FIG. 2 may have most likely moved to the center position of the horizontal candidate block HB(2) in FIG. 3. That is, the object corresponding to the first pixel PA1 in FIG. 2 may have moved two pixels rightward (for example, but not limited to, a positive sign may represent the rightward movement while a negative sign may represent the leftward movement). In this case, the horizontal motion estimation value of the first pixel PA1 can be determined to be 2.

Similarly, when the motion estimation circuit 150 needs to determine which pixel in FIG. 3 is corresponding to the first pixel PB1 in FIG. 2 to calculate the vertical motion estimation value between these two, the motion estimation circuit 150 can select a vertical comparison block HC0 including a plurality of pixels centered at the first pixel PB1, and select a plurality of vertical candidate blocks along the vertical direction centered at the vertical comparison block HC0. For example, in addition to the vertical candidate block disposed at the same place as the vertical comparison block HC0, the motion estimation circuit 150 can also select 3 vertical candidate blocks upward successively, and select 3 vertical candidate blocks downward successively. That is, the motion estimation circuit 150 can select a total of 7 vertical candidate blocks. In some other embodiments, the motion estimation circuit 150 may select a greater or lesser number of vertical candidate blocks depending on the requirements and limitations of the actual application for accuracy and computing resources.

Then, the motion estimation circuit 150 can calculate a plurality of vertical sums of absolute differences (SAD) between the display parameters in the first field information corresponding to the pixels in the vertical comparison block HC0 and the display parameters in the third field information corresponding to the pixels in the plurality of vertical candidate blocks respectively, and estimate the vertical motion estimation value of the first pixel PB1 according to the vertical candidate block having the smallest sum of absolute differences with the vertical comparison block HC0. For example, in FIG. 2 and FIG. 3, the display parameters in the first field information corresponding to the pixels of the vertical comparison block HC0 is most similar to the display parameters in the third field information corresponding to the pixels of the vertical candidate block HD(−1), that is, the sum of absolute differences between these two blocks is the smallest, meaning that the object corresponding to the first pixel PB1 in FIG. 2 may have moved one pixel downward (for example, but not limited to, a positive sign may represent the upward movement while a negative sign may represent the downward movement), that is, to the position of the first pixel PB2. In this case, the vertical motion estimation value of the first pixel PB1 can be determined to be (−1).

In FIG. 2, the horizontal comparison block HA0 and the vertical comparison block HC0 can have different sizes. For example but not limited to, the horizontal comparison block HA0 can have 3×9 pixels while the vertical comparison block HC0 can have 5×3 pixels. In some other embodiments, the image processing system 100 can change the size and/or the shape of the horizontal comparison block HA0 and the vertical comparison block HC0 according to the actual hardware design and/or accuracy requirement.

In FIG. 1, the motion compensation circuit 160 can be coupled to the motion estimation circuit 150. After the horizontal motion estimation values and the vertical motion estimation values are obtained, the motion compensation circuit 160 can calculate the horizontal compensating display parameter for each first pixel according to the horizontal motion estimation value of the first pixel, the first field information, and the third field information, and calculate the vertical compensating display parameter for each first pixel according to the vertical motion estimation value of the first pixel, the first field information, and the third field information.

For example, when the motion estimation circuit 150 has determined that the object corresponding to the first pixel PA1 may have moved two pixels rightward, that is to the position of the first pixel PA3, it may imply that when the image processing system 100 displays the second field information between the first field information and the third field information, the object corresponding to the first pixel PA1 in the first field information may have moved to the center between the first pixel PA1 and the first pixel PA3, that is, the position of the first pixel PA2. In this case, the motion compensation circuit 160 can calculate the average of the display parameter of the first pixel PA1 provided by the first field information and the display parameter of the first pixel PA3 provided by the third field information as the horizontal compensating display parameter of the first pixel PA2.

Similarly, the motion compensation circuit 160 can calculate the vertical compensating display parameter for each first pixel according to the vertical motion estimation value of the first pixel, the first field information, and the third field information.

Although each first pixel may be corresponding to a horizontal motion estimation value and a vertical motion estimation value, to avoid the difference between the motion estimation values and the actual motion from causing unreasonable compensating display parameters, the motion compensation circuit 160 can generate a horizontal estimation representative value for each row of first pixels according to the horizontal motion estimation values of first pixels in each row, and generate a vertical estimation representative value for each column of first pixels according to the vertical motion estimation values of first pixels in each column. According to the horizontal estimation representative value and the vertical estimation representative value corresponding to each first pixel, the general motion of the first pixel in the entire row and general motion of the first pixel in the entire column can be known, and the possibility of misjudging the moving direction can be reduced.

In some embodiments, the motion compensation circuit 160 can take the number of appearances of a horizontal motion estimation value that appears most frequently among the plurality of horizontal motion estimation values of the first pixels in the same row as the horizontal estimation representative value of the row. Similarly, the motion compensation circuit 160 can take the number of appearances of a vertical motion estimation value that appears most frequently among the plurality of vertical motion estimation values of the first pixels in the same column as the vertical estimation representative value of the column.

For example, in FIG. 2, if twenty of the twenty seven first pixels disposed in the same row as the first pixel PA1 have their horizontal motion estimation values to be 2, five of the twenty seven first pixels have their horizontal motion estimation values to be 1, and the remaining two first pixel have their horizontal motion estimation values to be 0, then the number of appearance 20 of the horizontal motion estimation value of 2 can be assigned as the horizontal estimation representative value since it appears most frequently.

In addition, if five of the fifteen first pixels disposed in the same column as the first pixel PA1 have their vertical motion estimation values to be (−1), six of the fifteen first pixels have their vertical motion estimation values to be 0, and the remaining four first pixels have their vertical motion estimation values to be 1, then the number of appearance 5 of the vertical motion estimation value of (−1) that appears most frequently can be assigned as the vertical estimation representative value. In this embodiment, if the vertical motion estimation value is 0, it means that no motion has occurred. Therefore, the motion compensation circuit 160 will omit the vertical motion estimation value 0, and select the number of appearance 5 of the vertical motion estimation value of (−1) as the vertical estimation representative value since it has the second highest number of appearances.

That is, the horizontal estimation representative value can represent the similarity of the horizontal motion estimation values of the first pixels in the same row, and the vertical estimation representative value can represent the similarity of the vertical motion estimation values of the first pixels in the same column. Therefore, the mixed display parameter generator 170 may determine to use the horizontal compensating display parameter or the vertical compensating display parameter according to the horizontal estimation representative value and the vertical estimation representative value.

The mixed display parameter generator 170 can be coupled to the motion compensation circuit 160 and the motion adaptive deinterlacing circuit 140. The mixed display parameter generator 170 can generate the mixed display parameter for each first pixel by using a weighted average of one of the horizontal compensating display parameter and the vertical compensating display parameter of the first pixel and a motion adaptive deinterlacing display parameter of the first pixel according to the horizontal estimation representative value and the vertical estimation representative value of the first pixel.

In some embodiments, to compare the horizontal estimation representative value and the vertical estimation representative value more effectively, the mixed display parameter circuit 170 can further normalize the horizontal estimation representative value and the vertical estimation representative value. For example, the mixed display parameter generator 170 can calculate a first ratio of the horizontal estimation representative value and a horizontal width of the display frame 112, and calculate a second ratio of the vertical estimation representative value and a vertical height of the display frame 112.

In the aforementioned embodiment, if the horizontal width of the display frame 112 is 27 pixels, and the vertical height of the display frame 112 is 15 pixels, then the first ratio would be 20/27, and the second ratio would be 5/15 with the first pixel PA1 being taken as an example. In this case, the first ratio is greater than the second ratio, meaning that the estimation of horizontal motion may be closer to the actual motion of the object than the estimation of the vertical motion. In this case, the mixed display parameter generator 170 can use the weighted average of the horizontal compensating display parameter of the first pixel PA1 and the motion adaptive deinterlacing display parameter of the first pixel PA1 to generate the mixed display parameter of first pixel PA1. Formula 1 shows the mixed display parameter CP of the first pixel PA1 according to one embodiment of the present invention.

$$CP=(1-HMC\_ratio) \times MADP + HMC\_ratio \times HMC\_output \quad \text{formula 1}$$

In formula 1, HMC_ratio represents the first ratio corresponding to the first pixel PA1, MADP represents the motion adaptive deinterlacing display parameter of the first pixel PA1, and HMC_output represents the horizontal compensating display parameter of the first pixel PA1. That is, when the first ratio HMC_ratio is larger, the horizontal motion estimation may be closer to the actual motion, therefore, the horizontal compensating display parameter HMC_output of the first pixel PA1 should have a greater weight in the mixed display parameter CP of the first pixel PA1. In addition, when the first ratio HMC_ratio is smaller, it may imply that the horizontal motion of this row of first pixels is insignificant. In this case, the motion adaptive deinterlacing display parameter MADP will have a greater weight in the mixed display parameter CP of the first pixel PA1, preventing the estimation error of the horizontal motion from causing the display parameters to deviate from the actual situation.

Conversely, when the second ratio is greater than the first ratio, it may imply that the estimation of vertical motion may be closer to the actual motion of the object than the estimation of the horizontal motion. Therefore, the compensating display parameter generator 170 will use the weighted average of the vertical compensating display parameter of the first pixel PA1 and the motion adaptive deinterlacing display parameter of the first pixel PA1 to generate the mixed display parameter of first pixel PA1. Formula 2 shows the mixed display parameter CP of the first pixel PA1 according to one embodiment of the present invention.

$$CP=(1-VMC\_ratio) \times MADP + VMC\_ratio \times VMC\_output \quad \text{formula 2}$$

In formula 2, VMC_ratio represents the second ratio corresponding to the first pixel PA1, MADP represents the motion adaptive deinterlacing display parameter of the first pixel PA1, and VMC_output represents the vertical compensating display parameter of the first pixel PA1. That is, when the second ratio VMC_ratio is larger, the vertical motion estimation may be closer to the actual motion, therefore, the vertical compensating display parameter VMC_output of the first pixel PA1 should have a greater weight in the mixed display parameter CP of the first pixel PA1.

Since the image processing system 100 can estimate the horizontal motion and the vertical motion of the object in the image, and can determine the possible motion direction, the image processing system 100 is able to adjust the ratio of the compensating display parameter and the adaptive motion deinterlacing display parameter in the mixed display parameter, which would be closer to the actual display parameter that should be displayed, thereby reducing the issues of blurred edges and flickering caused by incorrect interpolation in prior art.

In addition, in some embodiments, the receiving unit 120, the motion detection circuit 130, the motion adaptive deinterlacing circuit 140, the motion estimation circuit 150, the motion compensation circuit 160 and the mixed display parameter generator 170 can be implemented by different application specific integrated circuits (ASICs), or some of the circuits can be integrated to the same integrated circuits. Also, in some other embodiments, the receiving unit 120, the motion detection circuit 130, the motion adaptive deinterlacing circuit 140, the motion estimation circuit 150, the motion compensation circuit 160 and the mixed display parameter generator 170 can be implemented with processors or controllers executing the corresponding programs.

Figure 4:
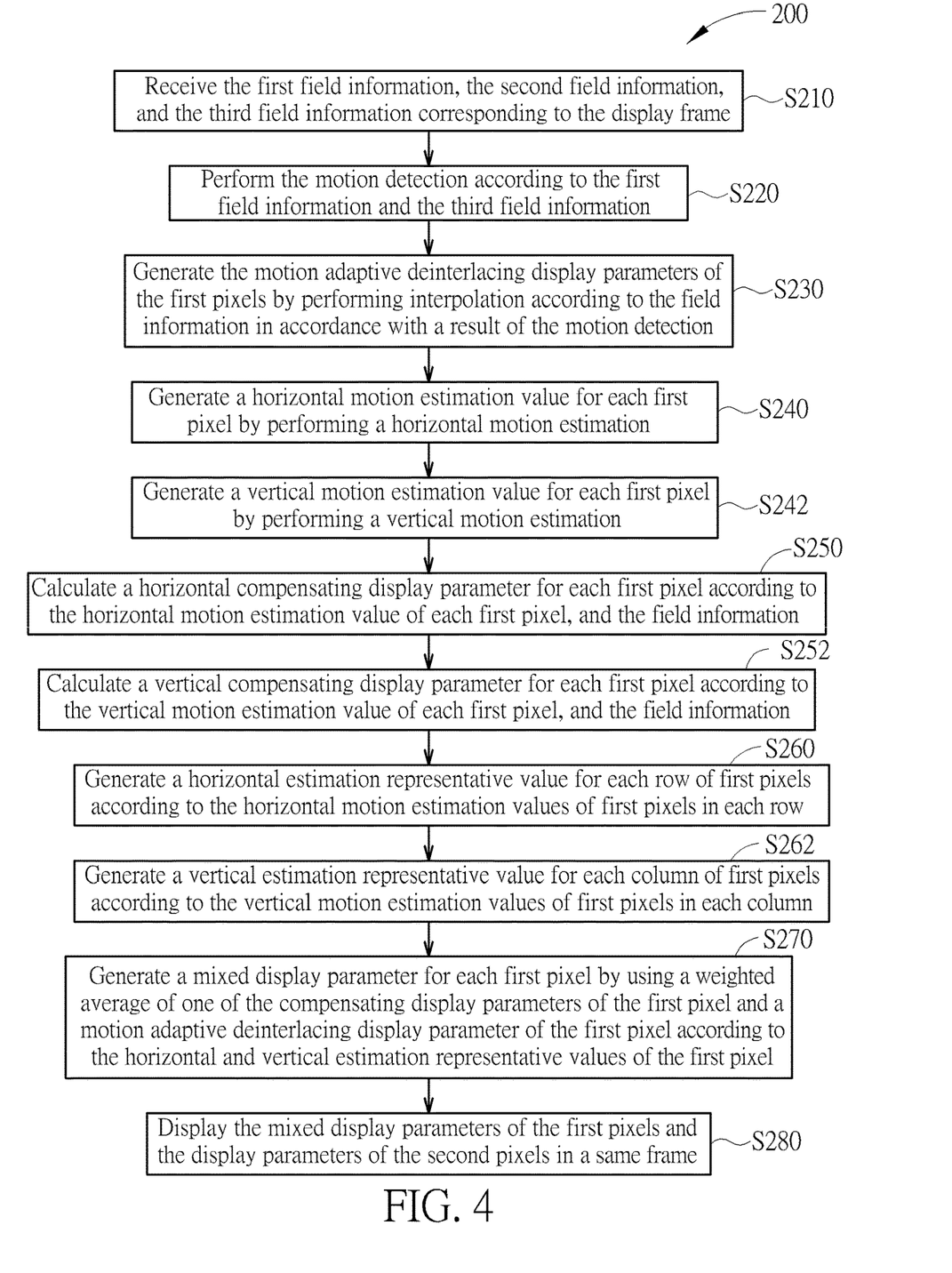
FIG. 4 shows a flow chart of an image processing method according to one embodiment of the present invention.

FIG. 4 shows a flow chart of an image processing method 200 according to one embodiment of the present invention.

S210: receive the first field information, the second field information, and the third field information corresponding to the display frame 112;

S220: perform the motion detection according to the first field information and the third field information;

S230: generate the motion adaptive deinterlacing display parameters of the first pixels by performing interpolation according to the first field information, the second field information, and/or the third field information in accordance with a result of the motion detection;

S240: generate a horizontal motion estimation value for each first pixel by performing a horizontal motion estimation according to the first field information and the third field information;

S242: generate a vertical motion estimation value for each first pixel by performing a vertical motion estimation according to the first field information and the third field information;

S250: calculate a horizontal compensating display parameter for each first pixel according to the horizontal motion estimation value of each first pixel, the first field information, and the third field information;

S252: calculate a vertical compensating display parameter for each first pixel according to the vertical motion estimation value of each first pixel, the first field information, and the third field information;

S260: generate a horizontal estimation representative value for each row of first pixels according to the horizontal motion estimation values of first pixels in each row;

S262: generate a vertical estimation representative value for each column of first pixels according to the vertical motion estimation values of first pixels in each column;

S270: generate a mixed display parameter for each first pixel by using a weighted average of one of the horizontal compensating display parameter and the vertical compensating display parameter of the first pixel and a motion adaptive deinterlacing display parameter of the first pixel according to the horizontal estimation representative value and the vertical estimation representative value of the first pixel;

S280: display the mixed display parameters of the first pixels in the first group of rows and the display parameters of the second pixels in the second group of rows in a same frame.

Since the image processing method 200 can estimate the horizontal motion and the vertical motion of the object in the image, and can determine the possible motion direction, the image processing method 200 is able to adjust the ratio of the compensating display parameter and the adaptive motion deinterlacing display parameter in the mixed display parameter, which would be closer to the actual display parameter that should be displayed, thereby reducing the issues of blurred edges and flickering caused by incorrect interpolation in prior art.

In some embodiments, the image processing method 200 can be applied to the image processing system 100. For example the receiving unit 120 can perform step S210, the motion detection circuit 130 can perform step S220, and the motion adaptive deinterlacing circuit 140 can perform step S230. Furthermore, the motion estimation circuit 150 can perform steps S240 and S242, and the motion compensation circuit 160 can perform steps S250, S252, S260, and S262. The mixed display parameter circuit 170 can perform step S270, and the display 110 can perform step S280. Therefore, the manner of execution of steps S210 to S280 can refer to the operating principle of the image processing system 100 described above.

In addition, in some embodiments, the method 200 can detect motions on one specific direction, for example, the horizontal direction or the vertical direction, and generate the mixed display parameter accordingly. For example, the method 200 can omit steps S242, S252, and S262. Also, in step S270, the method 200 can generate the mixed display parameter of each first pixel by using the weighted average of the horizontal compensating display parameter of the first pixel and the motion adaptive deinterlacing display parameter of the first pixel according to the horizontal estimation representative value of the first pixel. Or, the method 200 can omit steps S240, S250, and S260. Also, in step S270, the method 200 can generate the mixed display parameter of each first pixel by using the weighted average of the vertical compensating display parameter of the first pixel and the motion adaptive deinterlacing display parameter of the first pixel according to the vertical estimation representative value of the first pixel.

In summary, the image processing system and the image processing method can estimate the horizontal motion and the vertical motion of the object in the image, and can determine the possible motion direction; therefore, the ratio of the compensating display parameter and the adaptive motion deinterlacing display parameter in the mixed display parameter can be adjusted to be closer to the actual display parameter that should be displayed. Consequently, the issues of blurred edges and flickering caused by incorrect interpolation in prior art can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method comprising:

receiving first field information, second field information, and third field information corresponding to a display frame, wherein each of the first field information and the third field information has display parameters of first pixels disposed in a first group of rows of the display frame, the second field information has display parameters of second pixels disposed in a second group of rows of the display frame, and rows in the first group of rows and rows in the second group of rows are interfaced with one another; performing motion detection according to the first field information and the third field information;

generating a plurality of motion adaptive deinterlacing display parameters of the first pixels by performing interpolation according to the first field information, the second field information, and/or the third field information in accordance with a result of the motion detection;

generating a horizontal motion estimation value for each first pixel by performing a horizontal motion estimation according to the first field information and the third field information;

generating a vertical motion estimation value for each first pixel by performing a vertical motion estimation according to the first field information and the third field information; calculating a horizontal compensating display parameter for each first pixel according to the horizontal motion estimation value of each first pixel, the first field information, and the third field information;

calculating a vertical compensating display parameter for each first pixel according to the vertical motion estimation value of each first pixel, the first field information, and the third field information;

generating a horizontal estimation representative value for each row of first pixels according to a plurality of horizontal motion estimation values of first pixels in each row;

generating a vertical estimation representative value for each column of first pixels according to a plurality of vertical motion estimation values of first pixels in each column;

generating a mixed display parameter for each first pixel by using a weighted average of one of the horizontal compensating display parameter and the vertical compensating display parameter of the first pixel and a motion adaptive deinterlacing display parameter of the first pixel according to the horizontal estimation representative value and the vertical estimation representative value of the first pixel; and displaying a plurality of mixed display parameters of the first pixels in the first group of rows and the display parameters of the second pixels in the second group of rows in a same frame.

2. The method of claim 1, wherein generating the horizontal estimation representative value for the first pixels in each row of the first group of rows according to the plurality of horizontal motion estimation values of the first pixels in each row of the first group of rows comprises: taking number of appearances of a horizontal motion estimation value that appears most
frequently among the plurality of horizontal motion estimation values as the horizontal estimation representative value.

3. The method of claim 1, wherein generating the vertical estimation representative value for the first pixels in each column of the first group of rows according to the plurality of vertical motion estimation values of the first pixels in each column of the first group of rows comprises:
taking number of appearances of a vertical motion estimation value that appears most frequently among the plurality of vertical motion estimation values as the vertical estimation representative value.

4. The method of claim 1, wherein generating the mixed display parameter of each first pixel by using the weighted average of one of the horizontal compensating display parameter and the vertical compensating display parameter of the first pixel and the motion adaptive deinterlacing display parameter of the first pixel according to the horizontal estimation representative value and the vertical estimation representative value of the first pixel comprises:
calculating a first ratio of the horizontal estimation representative value and a horizontal width of the display frame;
calculating a second ratio of the vertical estimation representative value and a vertical height of the display frame; and
when the first ratio is greater than the second ratio, using a weighted average of the horizontal compensating display parameter of the first pixel and the motion adaptive deinterlacing display parameter of the first pixel to generate the mixed display parameter of first pixel.

5. The method of claim 1, wherein:
when the first ratio is larger, the horizontal compensating display parameter of the first pixel has a greater weight in the mixed display parameter of the first pixel.

6. The method of claim 1, wherein generating the mixed display parameter of each first pixel by using the weighted average of one of the horizontal compensating display parameter and the vertical compensating display parameter of the first pixel and the motion adaptive deinterlacing display parameter of the first pixel according to the horizontal estimation representative value and the vertical estimation representative value of the first pixel comprises:
calculating a first ratio of the horizontal estimation representative value and a horizontal width of the display frame;
calculating a second ratio of the vertical estimation representative value and a vertical height of the display frame; and
when the second ratio is greater than the first ratio, using a weighted average of the vertical compensating display parameter of the first pixel and the motion adaptive deinterlacing display parameter of the first pixel to generate the mixed display parameter of first pixel.

7. The method of claim 6, wherein:
when the second ratio is larger, the vertical compensating display parameter of the first pixel has a greater weight in the mixed display parameter of the first pixel.

8. The method of claim 1, wherein generating the horizontal motion estimation value for each first pixel by performing the horizontal motion estimation according to the first field information and the third field information comprises:
selecting a horizontal comparison block comprising a plurality of pixels centered at the first pixel;
calculating a plurality of horizontal sums of absolute differences (SAD) between display parameters in the first field information corresponding to the plurality of pixels in the horizontal comparison block and display parameters in the third field information corresponding to a plurality of pixels in a plurality of horizontal candidate blocks respectively; and
estimating the horizontal motion estimation value for each first pixel according to a horizontal candidate block corresponding to a smallest horizontal sum of absolute differences of the plurality of horizontal sums of absolute differences.

9. The method of claim 8, wherein generating the vertical motion estimation value for each first pixel by performing the vertical motion estimation according to the first field information and the third field information comprises:
selecting a vertical comparison block comprising a plurality of pixels centered at the first pixel;
calculating a plurality of vertical sums of absolute differences (SAD) between display parameters in the first field information corresponding to the plurality of pixels in the vertical comparison block and display parameters in the third field information corresponding to a plurality of pixels in a plurality of vertical candidate blocks respectively; and
estimating the vertical motion estimation value for each first pixel according to a vertical candidate block corresponding to a smallest vertical sum of absolute differences of the plurality of vertical sums of absolute differences;
wherein a size of the horizontal comparison block is different from a size of the vertical comparison block.

10. An image processing method comprising:
receiving first field information, second field information, and third field information corresponding to a display frame, wherein each of the first field information and the third field information has display parameters of first pixels disposed in a first group of rows of the display frame, the second field information has display parameters of second pixels disposed in a second group of rows of the display frame, and rows in the first group of rows and rows in the second group of rows are interfaced with one another;
performing motion detection according to the first field information and the third field information;
generating a plurality of motion adaptive deinterlacing display parameters of the plurality of rows of first pixels according to a result of the motion detection;
generating a motion estimation value for each first pixel by performing a motion estimation on a specific direction according to the first field information and the third field information;
calculating a compensating display parameter for each first pixel according to the motion estimation value of each first pixel, the first field information, and the third field information;

generating an estimation representative value for each row of first pixels according to a plurality of motion estimation values of first pixels in each row; and generating a mixed display parameter of each first pixel by using a weighted average of the compensating display parameter of the first pixel and a motion adaptive deinterlacing display parameter of the first pixel according to the estimation representative value of the first pixel.

11. A image processing system comprising:

a display frame;

a receiving device configured to receive first field information, second field information, and third field information corresponding to the display frame, wherein each of the first field information and the third field information has display parameters of first pixels disposed in a first group of rows of the display frame, the second field information has display parameters of second pixels disposed in a second group of rows of the display frame, and rows in the first group of rows and rows in the second group of rows are interfaced with one another;

a motion detection circuit coupled to the receiving device, and configured to perform motion detection according to the first field information and the third field information;

a motion adaptive deinterlacing circuit coupled to the motion detection circuit, and configured to generate a plurality of motion adaptive deinterlacing display parameters corresponding to the plurality of rows of first pixels by performing interpolation according to the first field information, the second field information, and/or the third field information in accordance with a result of the motion detection;

a motion estimation circuit coupled to the receiving device, and configured to generate a horizontal motion estimation value for each first pixel by performing a horizontal motion estimation according to the first field information and the third field information, and generate a vertical motion estimation value for each first pixel by performing a vertical motion estimation according to the first field information and the third field information;

a motion compensation circuit coupled to the motion estimation circuit, and configured to calculate a horizontal compensating display parameter for each first pixel according to the horizontal motion estimation value of each first pixel, the first field information, and the third field information, calculate a vertical compensating display parameter for each first pixel according to the vertical motion estimation value of each first pixel, the first field information, and the third field information, generate a horizontal estimation representative value for each row of first pixels according to a plurality of horizontal motion estimation values of first pixels in each row, and generate a vertical estimation representative value for each column of first pixels according to a plurality of vertical motion estimation values of first pixels in each column; and a mixed display parameter generator coupled to the motion compensation circuit and the motion adaptive deinterlacing circuit, and configured to generate a mixed display parameter for each first pixel by using a weighted average of one of the horizontal compensating display parameter and the vertical compensating display parameter of the first pixel and a motion adaptive deinterlacing display parameter of the first pixel according to the horizontal estimation representative value and the vertical estimation representative value of the first pixel;

wherein a plurality of mixed display parameters of the first pixels in the first group of rows and the display parameters of the first pixels in the second group of rows are displayed by the display frame in a same frame.

12. The image processing system of claim 11, wherein the motion estimation circuit is configured to take number of appearances of a horizontal motion estimation value that appears most frequently among the plurality of horizontal motion estimation values as the horizontal estimation representative value.

13. The image processing system of claim 11, wherein the motion estimation circuit is configured to take number of appearances times of a vertical motion estimation value that appears most frequently among the plurality of vertical motion estimation values as the vertical estimation representative value.

14. The image processing system of claim 11, wherein the mixed display parameter generator is further configured to:

calculate a first ratio of the horizontal estimation representative value and a horizontal width of the display frame;

calculate a second ratio of the vertical estimation representative value and a vertical height of the display frame; and when the first ratio is greater than the second ratio, using a weighted average of the horizontal compensating display parameter of the first pixel and the motion adaptive deinterlacing display parameter of the first pixel to generate the mixed display parameter of the first pixel.

15. The image processing system of claim 14, wherein:

when the first ratio is larger, the horizontal compensating display parameter of the first pixel has a greater weight in the mixed display parameter of the first pixel.

16. The image processing system of claim 11, wherein the mixed display parameter generator is further configured to:

calculate a first ratio of the horizontal estimation representative value and a horizontal width of the display frame;

calculating a second ratio of the vertical estimation representative value and a vertical height of the display frame; and when the second ratio is greater than the first ratio, use a weighted average of the vertical compensating display parameter of the first pixel and the motion adaptive deinterlacing display parameter of the first pixel to generate the mixed display parameter of first pixel.

17. The image processing system of claim 16, wherein:

when the second ratio is larger, the vertical compensating display parameter of the first pixel has a greater weight in the mixed display parameter of the first pixel.

18. The image processing system of claim 11, wherein the motion adaptive deinterlacing circuit is further configured to:

when the result of the motion detection shows that a motion has occurred between the first field information and the third field information, generate the plurality of motion adaptive deinterlacing display parameters of the first pixels by performing interpolation according to the display parameters of the second pixels provided by the second field information; and when the result of the motion detection shows that no motion has occurred between the first field information and the third field information, generate the plurality of motion adaptive deinterlacing display parameters of the first pixels by performing interpolation according to the display parameters of the first pixels provided by the first field information and the display parameters of the first pixels provided by the third field information.

19. The image processing system of claim 11, wherein the motion estimation circuit is further configured to: select a horizontal comparison block comprising a plurality of pixels centered at the first pixel;
   calculate a plurality of horizontal sums of absolute differences (SAD) between display parameters in the first field information corresponding to the plurality of pixels in the horizontal comparison block and display parameters in the third field information corresponding to a plurality of pixels in a plurality of horizontal candidate blocks respectively; and
   estimate the horizontal motion estimation value for each first pixel according to a horizontal candidate block corresponding to a smallest horizontal sum of absolute differences of the plurality of horizontal sums of absolute differences.

20. The image processing system of claim 19, wherein:

the motion estimation circuit is further configured to:

select a vertical comparison block comprising a plurality of pixels centered at the first pixel;

calculate a plurality of vertical sums of absolute differences (SAD) between display parameters in the first field information corresponding to the plurality of pixels in the vertical comparison block and display parameters in the third field information corresponding to a plurality of pixels in a plurality of vertical candidate blocks respectively; and estimate the vertical motion estimation value for each first pixel according to a vertical candidate block corresponding to a smallest vertical sum of absolute differences of the plurality of vertical sums of absolute differences; and a size of the horizontal comparison block is different from a size of the vertical comparison block.

* * * * *